(12) United States Patent
Brunnhofer

(10) Patent No.: US 6,582,643 B1
(45) Date of Patent: Jun. 24, 2003

(54) METHOD FOR PRODUCING HOLLOW EXTRUSIONS

(75) Inventor: Erwin Brunnhofer, Fuldabrück (DE)

(73) Assignee: Technoform Caprano + Brunnhofer Ohg, Fuldabruck (DE)

( * ) Notice: Subject to any disclaimer, the term of this patent is extended or adjusted under 35 U.S.C. 154(b) by 0 days.

(21) Appl. No.: 09/565,526

(22) Filed: May 5, 2000

(30) Foreign Application Priority Data

May 8, 1999 (DE) ......................................... 199 21 458

(51) Int. Cl.[7] ............................................... B29C 47/90
(52) U.S. Cl. ............................ 264/177.17; 264/209.4; 264/209.7; 264/210.5; 425/516; 425/505
(58) Field of Search ...................... 264/177.17, 177.19, 264/177.16, 210.2, 210.5, 171.12, 171.27, 171.26, 173.17, 209.1, 209.4, 209.7, 209.3; 425/132, 131.1, 505, 516, 325, 388, 387.1, 113, 110

(56) References Cited

U.S. PATENT DOCUMENTS

| 4,196,464 A | * | 4/1980 | Russell | 264/171.27 |
| 4,777,001 A | * | 10/1988 | Kobayashi et al. | 264/177.17 |
| 5,348,536 A | * | 9/1994 | Young et al. | 264/171.27 |
| 5,376,319 A | * | 12/1994 | Arima | 264/177.19 |
| 5,433,808 A | * | 7/1995 | Yada et al. | 264/177.17 |
| 5,486,325 A | * | 1/1996 | Arima | 264/177.16 |
| 5,679,303 A | * | 10/1997 | Hayashi et al. | 264/177.17 |
| 5,783,286 A | | 7/1998 | Dinocola | 264/167 |
| 5,958,318 A | * | 9/1999 | Hayashi | 264/177.16 |

FOREIGN PATENT DOCUMENTS

| EP | 0 584 467 | | 3/1994 |
| EP | 0 698 471 | | 2/1996 |
| JP | 56 019732 | | 2/1981 |
| JP | 56056844 A | * | 5/1981 |
| JP | 58205746 A | * | 11/1983 |
| JP | 01266218 A | * | 10/1989 |
| WO | 96 30188 | | 10/1996 |

* cited by examiner

Primary Examiner—Mark Eashoo
Assistant Examiner—Geoffrey P. Shipsides
(74) Attorney, Agent, or Firm—Herbert Dubno

(57) ABSTRACT

Hollow extrusions are formed by initially extruding a plurality of separate strands adapted to form segments of the completed hollow extrusion in their positions corresponding to the locations of those segments in the finished extrusion. Webs between these strands are then formed by feeding an afterflow of the melt at press pressure into the shaping channel in the calibrator downstream from the die zone so that under the pressure of this melt and the melt heat, the webs fuse to the ends of ribs of the separate strands.

2 Claims, 8 Drawing Sheets

METHOD FOR PRODUCING HOLLOW EXTRUSIONS

FIELD OF THE INVENTION

My present invention relates to a method of producing hollow extrusions using the cold nozzle process and, more particularly, to a method of producing a hollow extrusion of a thermoplastic synthetic resin which has a constant cross section over its length. The invention also relates to an apparatus for that purpose.

BACKGROUND OF THE INVENTION

In the cold-nozzle process of thermoplastic synthetic resin extrusion, a melt of the synthetic resin is extruded through a heated die zone and directly thereafter and while under the extrusion-press pressure, is forced through a cooled calibration zone with internal and external cooling of the hollow strand.

The apparatus for carrying out that process generally comprises a heated die and a coolable calibration tool having a coolable mandrel arrangement forming the cavity or hollow of the extrusion, the die and the calibration tool being connected through the intermediary of a thermal insulating layer in a closed system which can be maintained under the extrusion pressure or the pressure of the melt during extrusion.

In the patent publication WO 96/30188, the thermoplastic synthetic resin melt in its final hollow chamber cross sectional shape passes from the die to the calibration tool. The mandrel arrangement which is of controllable temperature, i.e. can be heated or cooled, is held in the die and extends into the calibrator. If the hollow extrusion shape is to be maintained with minimal tolerances, it is necessary to operate with very low extrusion speeds with such apparatus. This is also the case when the hollow extruded shape has wall thicknesses which differ significantly from one another at different parts of the final cross section.

OBJECTS OF THE INVENTION

It is the principal object of the present invention to provide an improved method of producing a hollow extrusion, especially a hollow extrusion of a thermoplastic synthetic resin with a constant cross section over its length and with high precision at high speed.

Another object of this invention is to provide an improved apparatus for producing a hollow extrusion of complex configuration at high speed with the cold-nozzle process as described above.

It is also an object of this invention to provide a method of and an apparatus for producing hollow extrusions of thermoplastic synthetic resin whereby drawbacks of earlier approaches are avoided.

SUMMARY OF THE INVENTION

The reference to a "hollow extrusion" here is intended to describe an extrusion of thermoplastic synthetic resin having at least one peripherally-closed chamber. Such extrusions generally have one or more flanges, wings or ribs extending from the peripherally-closed chamber and the peripherally-closed chamber can be of any cross sectional shape and usually is rectangular, trapezoidal or of another polygonal shape.

The extrusions can be used for a variety of purposes, for example in or as window frames, as structural framing members and as supports for panels or the like.

The aforementioned objects are achieved, in accordance with the invention, by extruding the synthetic resin melt in the form of a plurality of mutually independent open partial profiles which are oriented with respect to one another in accordance with the orientation of the segments of the finished hollow extrusion which are to be formed by these partial shapes. The webs of synthetic resin material between these partial extrusions or profiles, formed by an afterflow of the melt under the extrusion pressure which comes into contact with the partial profiles in the calibration zone so that at least in part by the heat of the melt, there is a fusion of the material of these partial webs to the partial profiles and a unitary product is formed. More particularly, the method of producing the hollow extrusion of thermoplastic synthetic resin of a constant hollow extrusion cross section over the length thereof comprises the steps of (a) extruding a molten thermoplastic synthetic resin in a plurality of independent open partial-profile strands through a heated die zone in a pattern corresponding to cross-sectionally open segments of the hollow-extrusion cross section but with partial ribs having spaced-apart ends juxtaposed with one another across respective gaps into a cooled calibration zone, the strands being positioned and oriented correspondingly to the respective positions and orientations of the segments in the hollow-extrusion cross section;

(b) cooling the strands along inner and outer sides of the hollow-extrusion cross section while advancing the strands through the cooled calibration zone under extrusion-press pressure; and (c) in the cooled calibration zone and downstream from the heated die zone feeding an afterflow of molten synthetic resin under the extrusion-press pressure and maintained flowable to this point into the gaps for fusion to the ends of the partial ribs under heat of the molten synthetic resin thereby forming webs bridging the partial ribs and completing the hollow-extrusion cross section.

Preferably at least in the regions in which the webs are extruded into contact with the ends of the partial ribs and where the molten synthetic resin of the webs is to be fused to the partial ribs, the corresponding portions of the periphery of the hollow shape in the calibration zone retain heat, thereby promoting the bond or fusion between the webs and the partial ribs under all conditions. The internal cooling of the hollow extrusion cross section can be effected first in the calibration zone and not, as is conventional, already begun in the die zone.

According to a feature of the invention, therefore, the method comprises the step of maintaining an elevated temperature of the strands at least in a region of its ends over a starting portion of the cooled calibration zone. The apparatus for producing the hollow extrusion can comprise:

means forming a heated extrusion die for extruding a molten thermoplastic synthetic resin in a plurality of independent open partial-profile strands in a pattern corresponding to cross-sectionally open segments of the hollow-extrusion cross section but with partial ribs having spaced-apart ends juxtaposed with one another across respective gaps, the strands being positioned and oriented correspondingly to the respective positions and orientations of the segments in the hollow-extrusion cross section;

a calibrator separated from the heated extrusion die by an insulating layer and forming an assembly therewith for advance of extrusion under extrusion-press pressure, the calibrator receiving the strands for cooling the strands along inner and outer sides of the hollow-extrusion cross section while advancing the strands through the cooled calibration zone under the extrusion-press pressure; and means in the cooled calibration zone and downstream from the heated die for feeding an afterflow of still molten synthetic resin under the extrusion-press pressure into the gaps for fusion to the ends of the partial ribs under heat of the molten synthetic resin thereby forming webs bridging the partial ribs and completing the hollow-extrusion cross section.

For this purpose, respective channels can be formed in the extrusion die to produce the strands and the die can have a duct for supplying the molten synthetic resin which is branched to those channels.

According to another feature of the invention the calibrator is formed with respective channels receiving the strands, the apparatus further comprising thermally conductive projections extending into the channels from the extrusion die for maintaining an elevated temperature of the strands at least in a region of the ends over a starting portion of the cooled calibration zone. The projections can be provided in pairs on a heat-conducting insert and a mandrel can be retained within the insert and the respective projections.

The invention thus solves the problem of high extrusion speeds by forming segments of the hollow extrusion cross section as open strands, i.e. strands which are not peripherally closed, and thus which can be extruded at high speeds. Only in the calibration zone, after cooling at least initially, by merger with the afterflow of the synthetic resin melt under press pressure and maintained molten by the heat conductivity insert are these segments joined together to complete the hollow chamber configuration, i.e. to form the chamber with closed periphery.

From EP 0 584 467 it is known to produce segments of a hollow extrusion, but here, these segments after calibration, with heating anew, are joined together to form the hollow extrusion. The strands passing simultaneously from the die zone form the sum of the final hollow extrusion and the strands must be subjected to renewed heating to allow them to be pressed together. The method of the invention differs by conveying the thermoplastic melt into the cooled calibration zone and joining that melt with the individual strands so that heat from the melt effects fusion of the webs formed by the melt with the strands.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
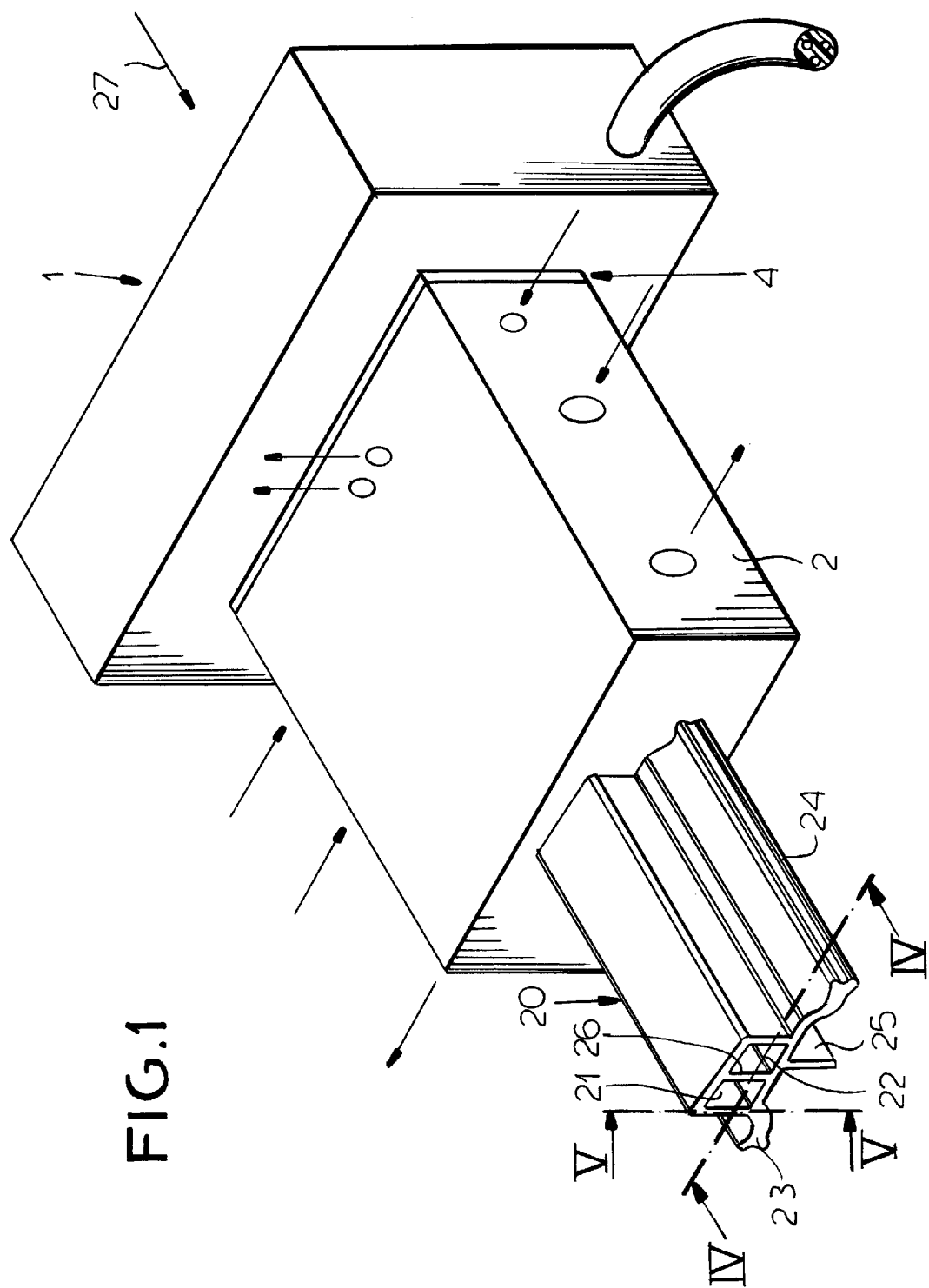
FIG. 1 is perspective view of an apparatus for producing a hollow extrusion of thermoplastic synthetic resin according to the invention.
Figure 2:
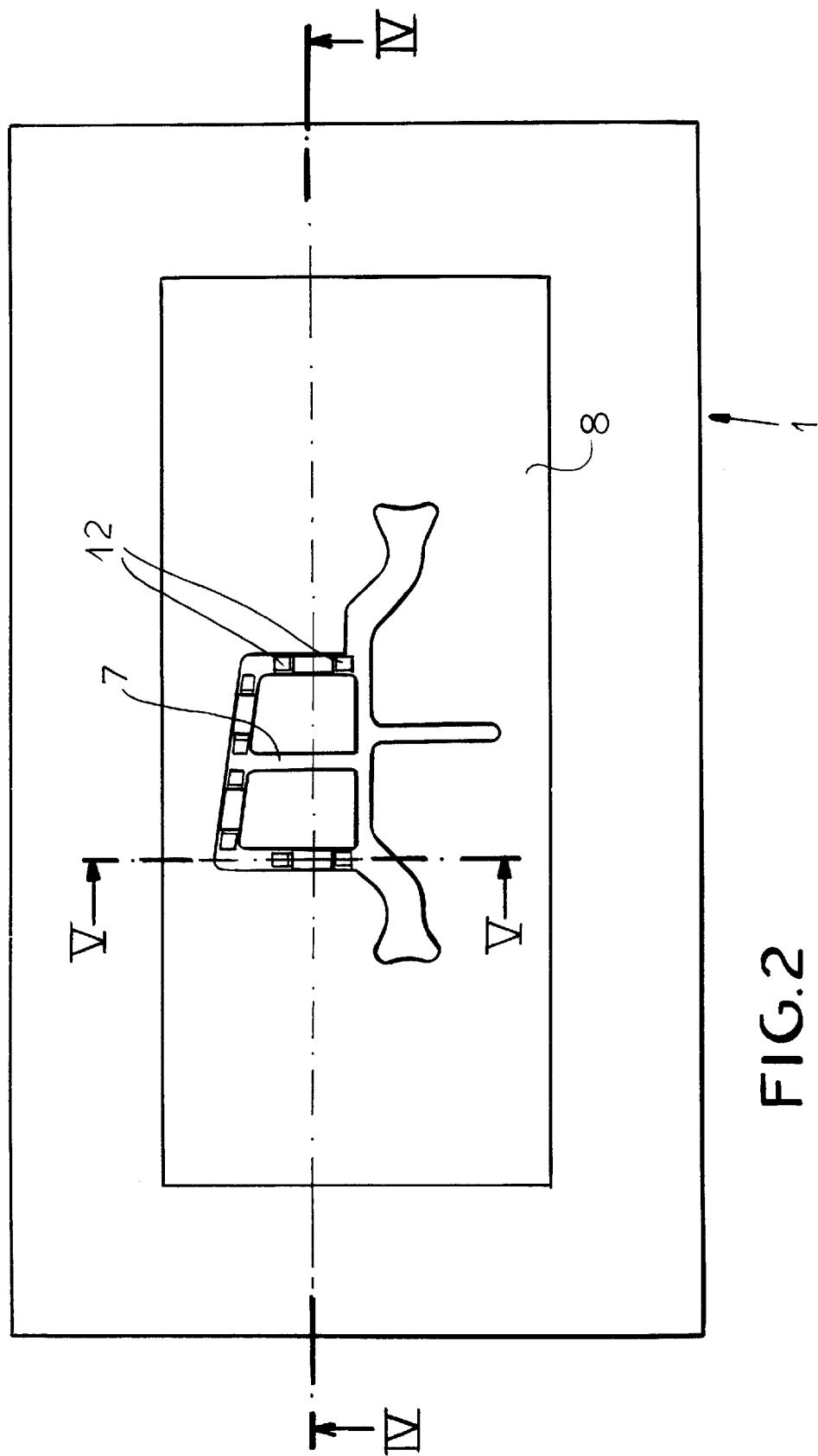
FIG. 2 is an elevational view of the outlet of the die zone for the apparatus of FIG. 1.
Figure 3:
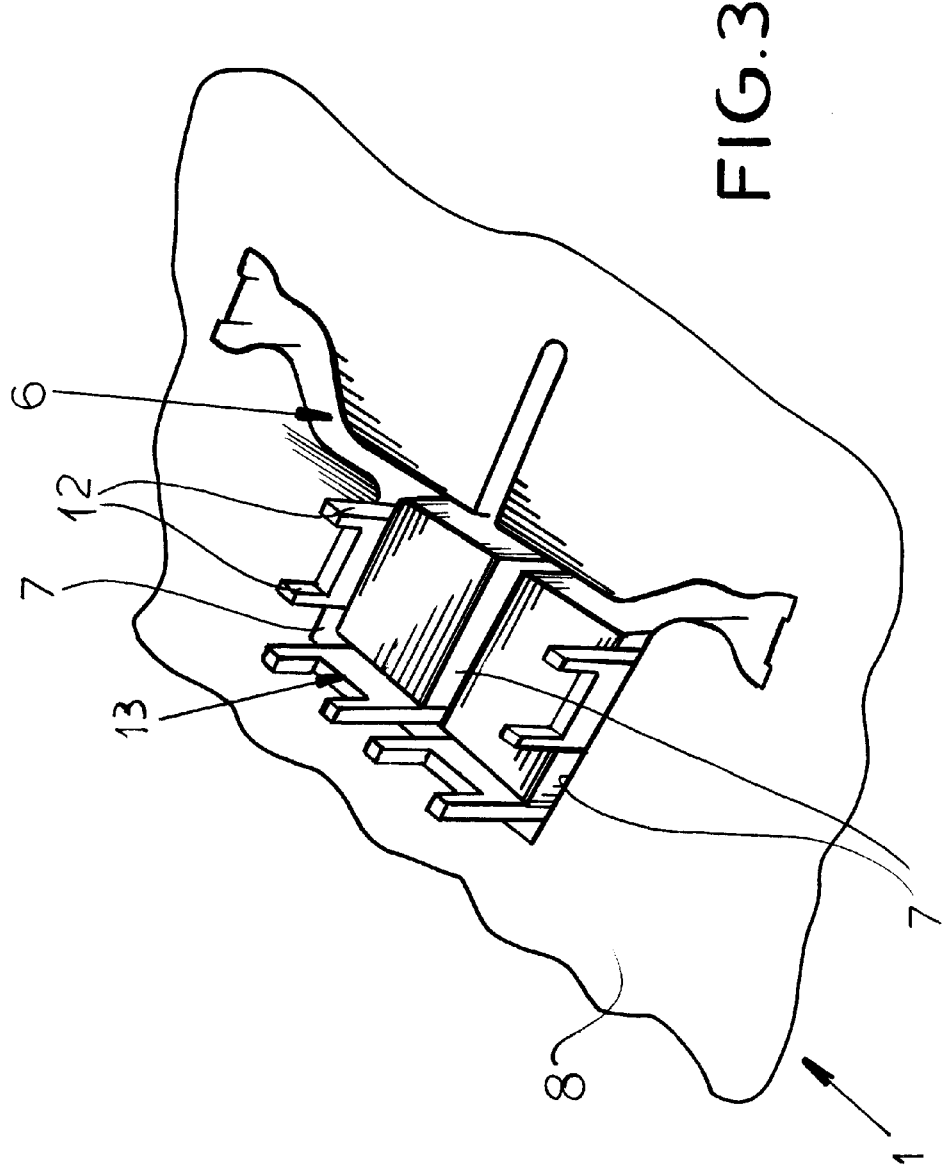
FIG. 3 is a perspective view of the outlet of the die zone with removal of the calibrator.

The apparatus shown in the drawing serves to produce a hollow extrusion which is of constant cross section over its entire length and is composed of a thermoplastic synthetic resin, using the cold-nozzle process. The cross section of the finished extrusion 20 has been shown in FIG. 1 and includes two chambers 21 and 22 of trapezoidal cross section and which are peripherally closed. It also includes a pair of lateral wings 23 and 24 and a downwardly-extending rib 25 of generally rectangular cross section. The wings 23 and 24 can be of variable thickness and a web 26 can separate the two chambers or hollows 21 and 22 and can be thinner than the remaining walls of those chambers.

Figure 4:
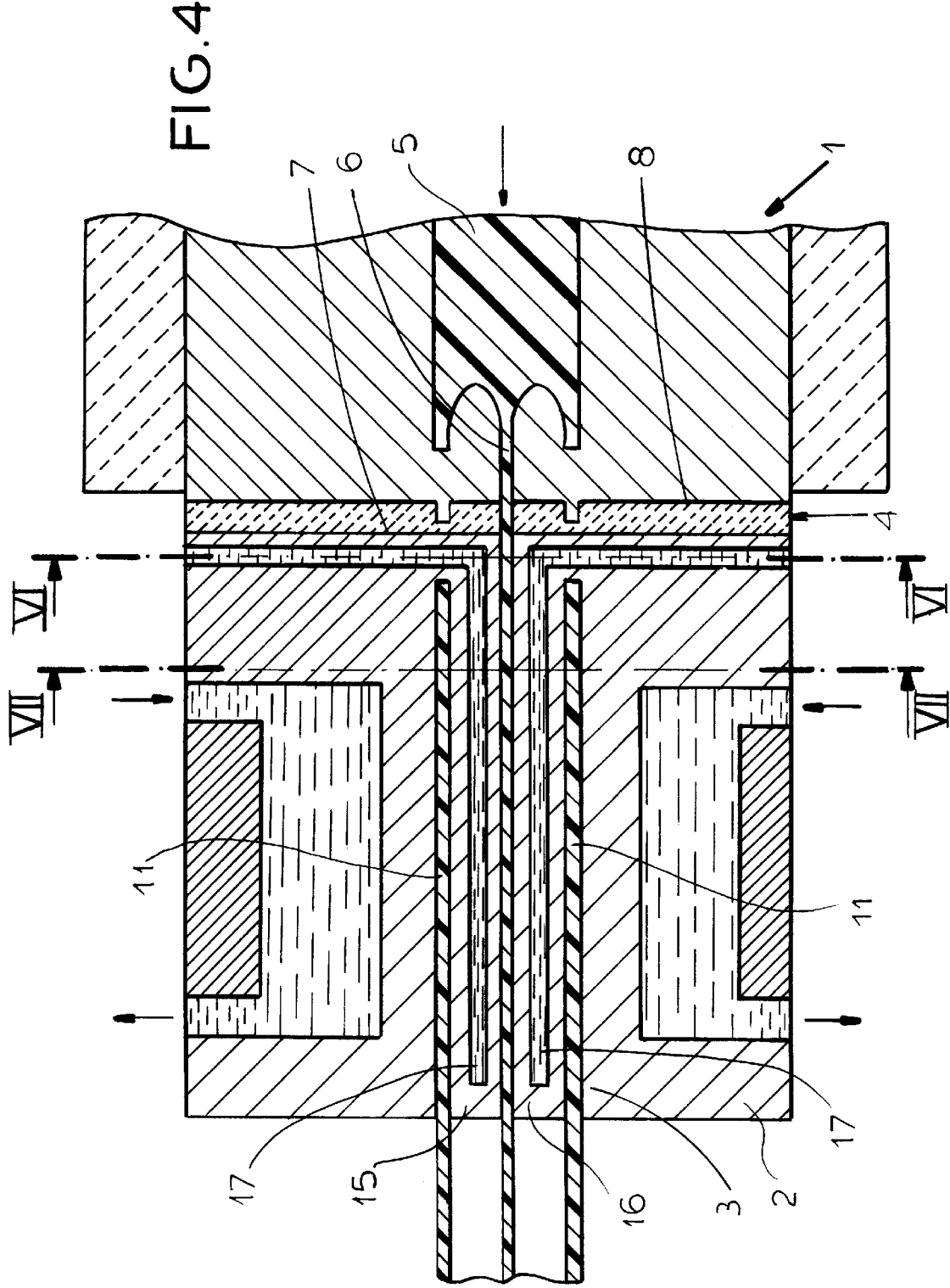
FIG. 4 is a cross sectional view in highly diagrammatic form taken along the line IV—IV in FIG. 1 and correspondingly along line V—V of FIG. 2.

This is a typical hollow extrusion cross section and, in the system of the present invention, can be fabricated by a heated die member 1 and a calibrating tool 2 which is cooled and which is provided with a coolable mandrel arrangement 3 capable of forming the chambers 21 and 22. The die 1 and the calibrating tool 2 are joined together separated only by a thermal insulating layer 4 which, as shown in FIG. 4, is a layer of a solid thermal insulation although it can also be a narrow air gap. The assembly 1, 2, 3, 4 forms a closed system under the pressure of the melt which is supplied in the direction of arrow 27, e.g. by an extrusion press, for example, a double-worm extruder.

Figure 6:
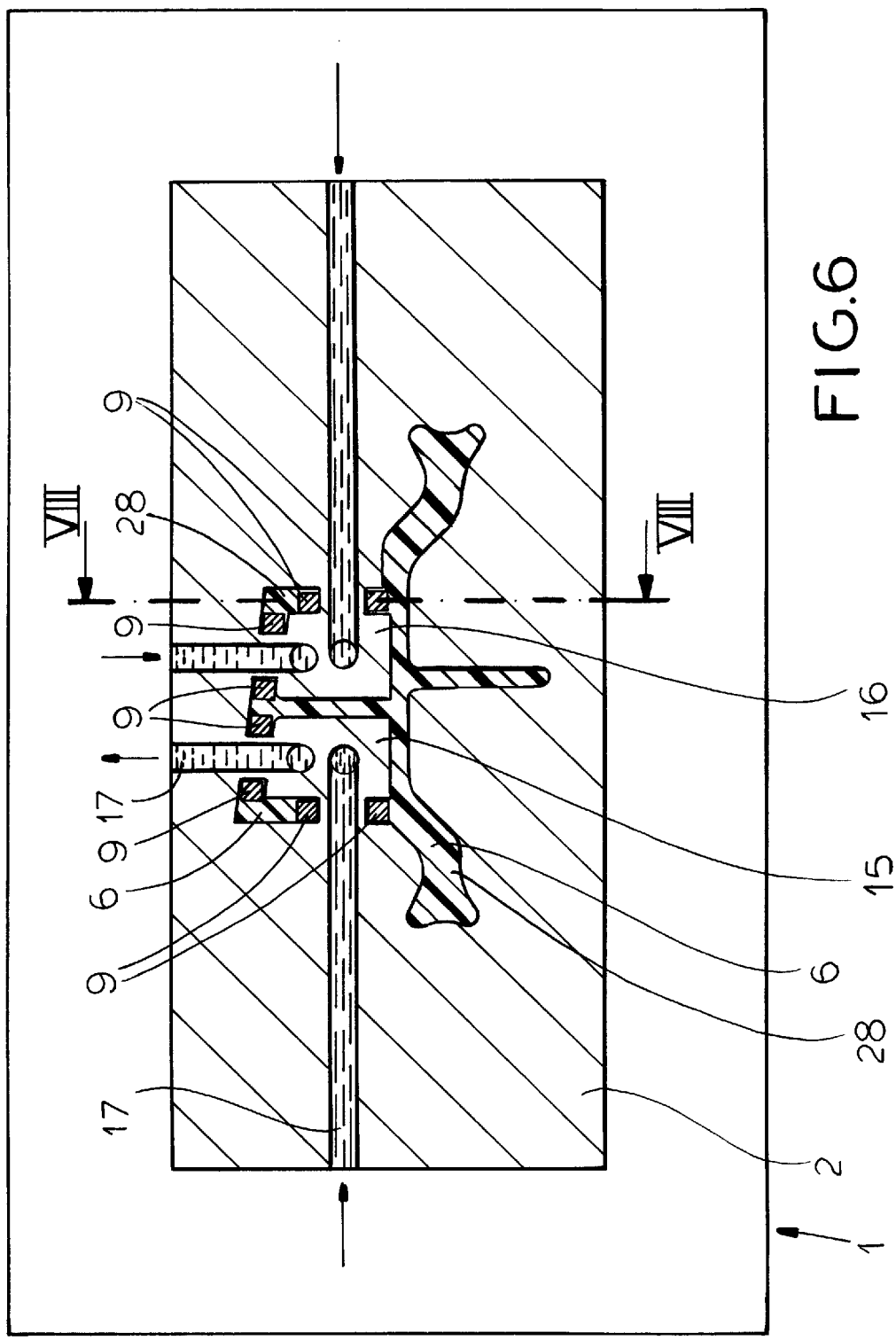
FIG. 6 is a cross sectional view taken along the line VI—VI of FIG. 4.

The die 1 has, at its side turned toward the calibrator 2, a plurality of passages 6 which open at 7 at the die face in a plurality of spaced-apart orifices in the die face 8 from which emerge respective partial profiles or strands which are located at the respective locations of the extruded segments in the final hollow chamber cross section. The strands which emerge from the orifices 7 in the die face 8 have been shown in section in FIG. 6 and have been represented at 28. These segments or strands 28 have ends or edges 9, referred to as partial rib ends which are separated from one another by missing web portions 10 of the complete hollow extrusion.

Figure 5:
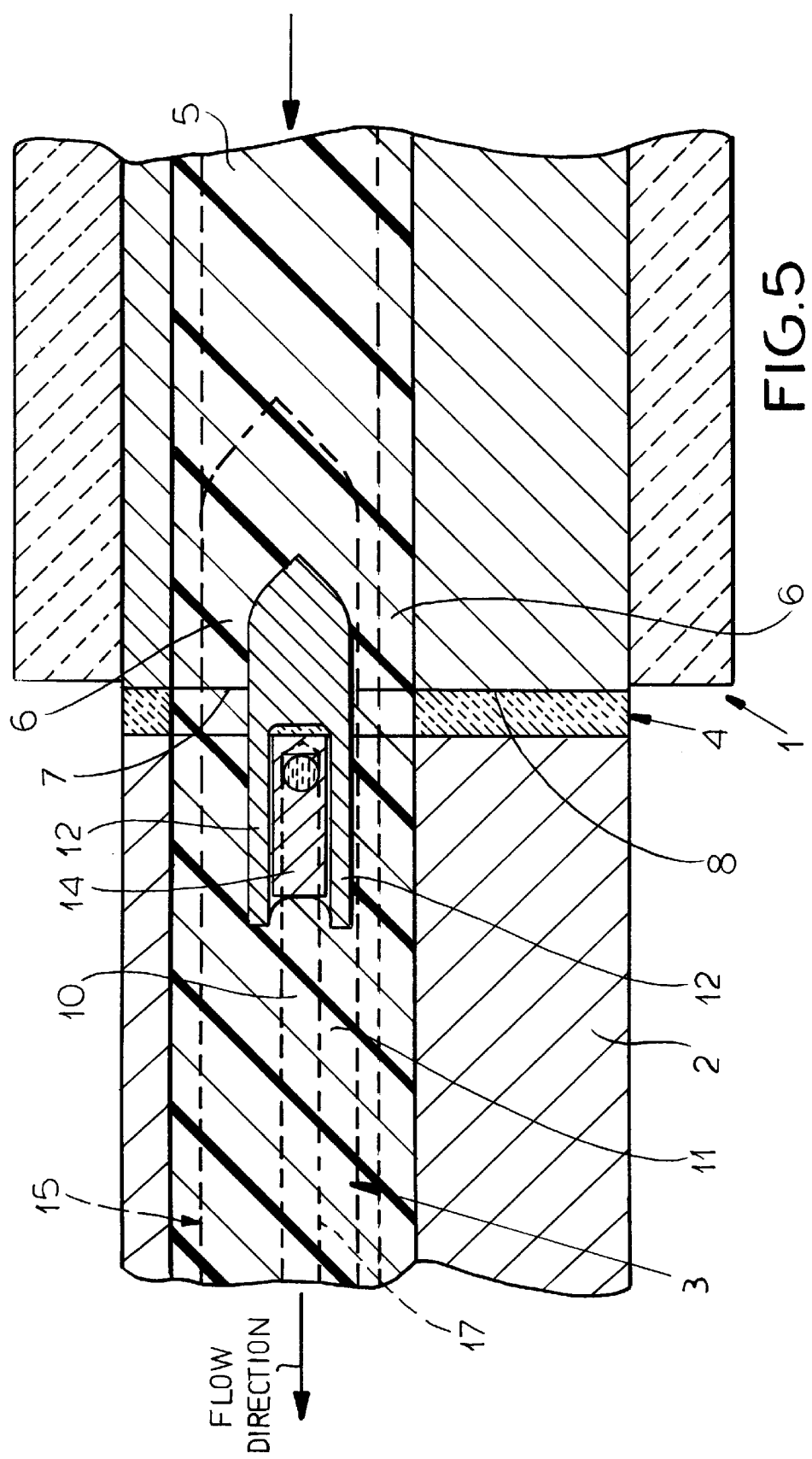
FIG. 5 is a cross sectional view also in highly diagrammatic form taken along line V—V of FIG. 2.
Figure 7:
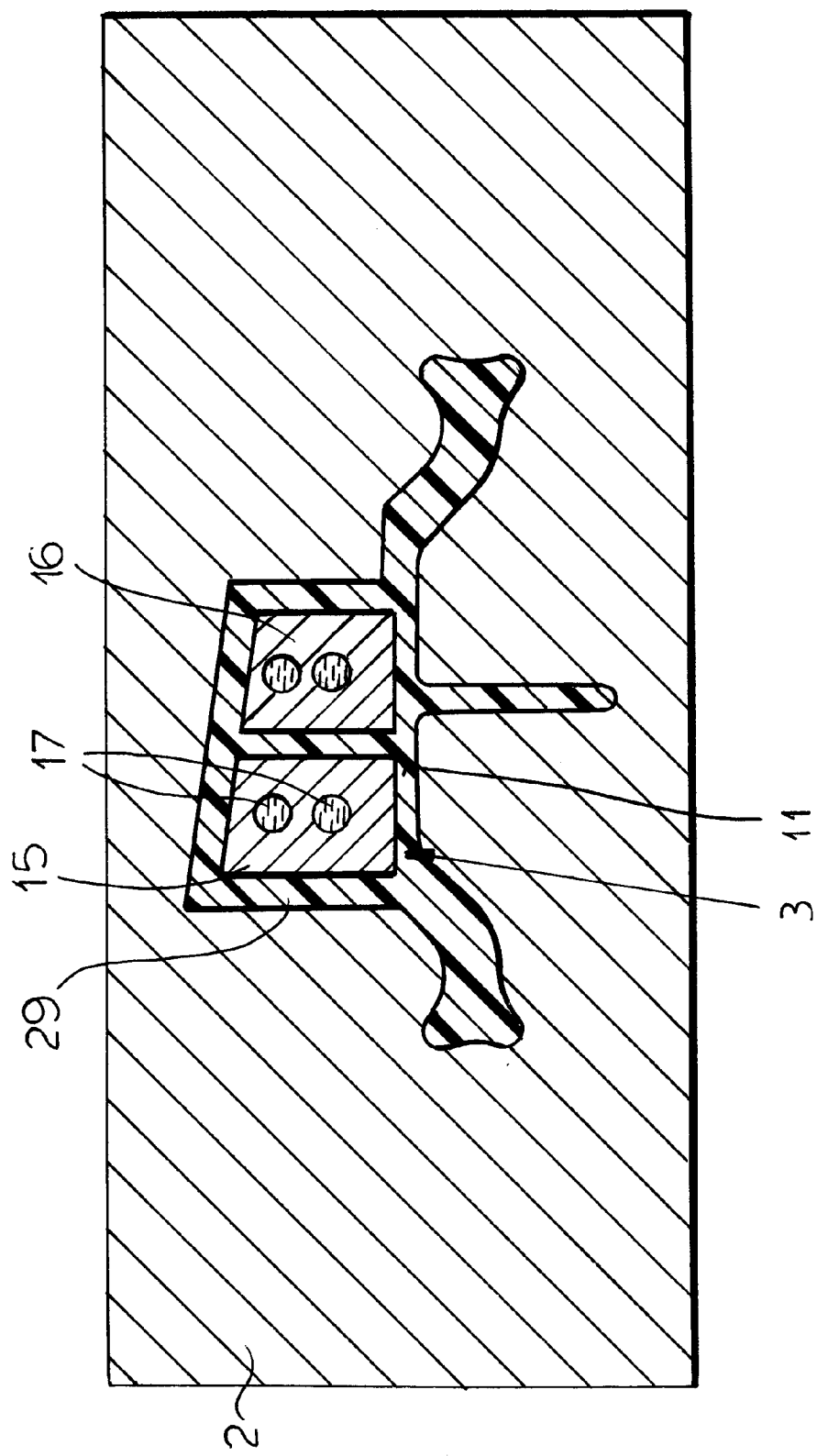
FIG. 7 is a cross sectional view taken along the line VII—VII of FIG. 4.
Figure 8:
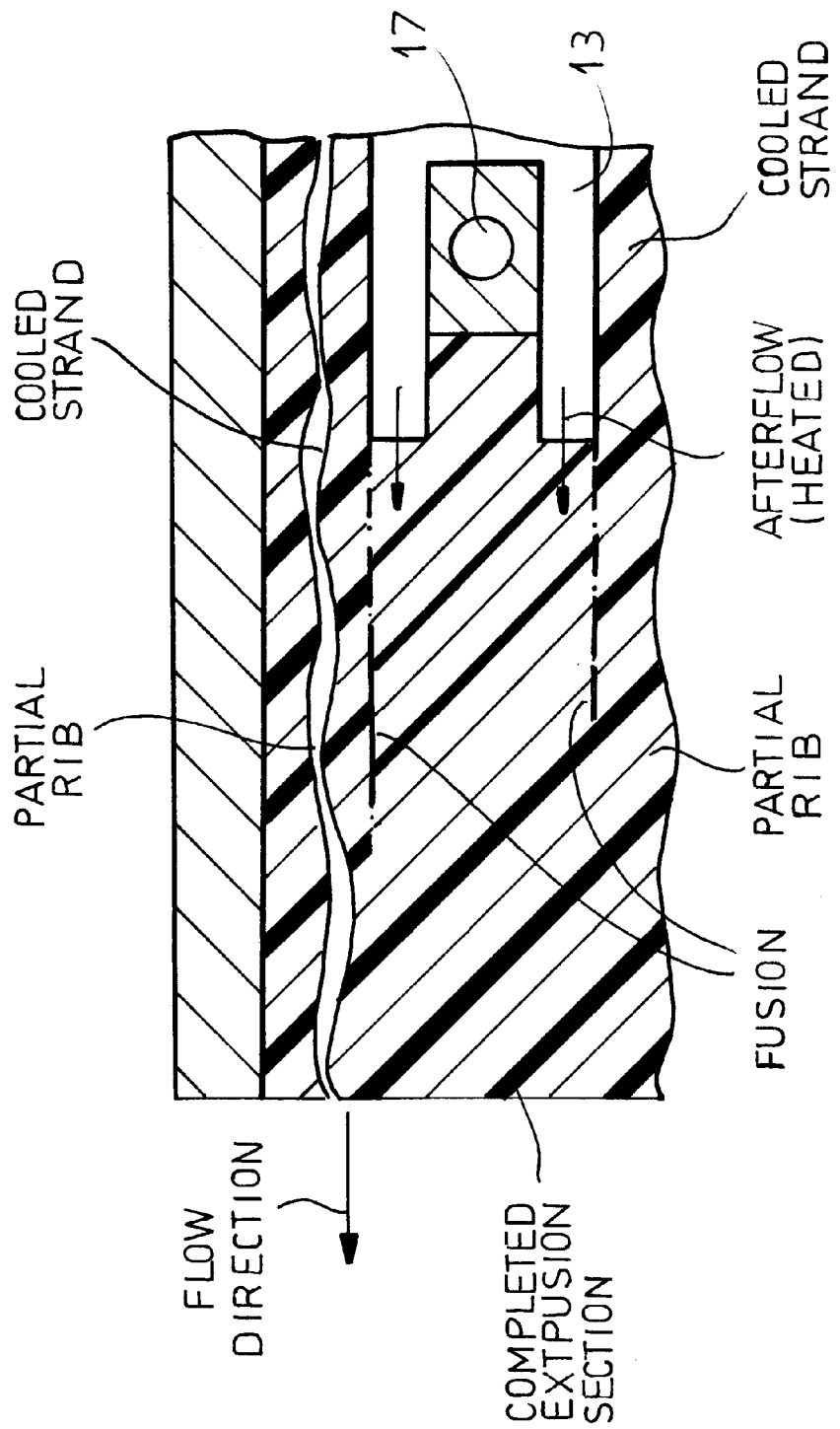
FIG. 8 is a detail section taken along the line VIII—VIII of FIG. 6.

Within the calibrating tool, the passages 6 open into corresponding portions of the channel 11 which has the finished hollow extrusion shape (see FIGS. 5 and 7). At the transition region, where the webs 10 are still missing, a heat-conducting insert 13 of copper and paired projections 12, also of copper, extend into the channel 11. Through the insert 13 the afterflowing synthetic resin melt maintained molten by the insert 13, is fed directly into the channel 11 to bridge the ends 9 and form the webs connecting the segments 28 into the complete extrusion 20. The synthetic resin melt is fed at extrusion-press pressure into channel 11 and at this pressure and with the heat of the melt fuses to the ends 9 and forms the bond therewith so that the completed extrusion 20 is fully unitary and of one piece.

The completion of the hollow extrusion cross section by these webs and their fusion to the ends 9 is promoted by the heat-conductive projections 12 of the insert 13 which maintain the heat of the ends 9 and can deliver the melt to the cooling tool 2 at the ends of these projections to form the connecting webs (see FIG. 7) where one such web is shown at 29. At this stage distinctions can no longer be made between the webs and the segments 28. The projections 12 and the insert 13 which extend from the die 1 into the calibrating tool 2 can be composed of copper.

FIG. 5 shows how a mandrel holder 14 can be provided for the coolable mandrel arrangement 3. The mandrel holder 14 can be formed in one piece with the calibrating tool 2 and can hold the two mandrels 15, 16 of the mandrel arrangement 3, although multipart configurations are also possible. Bores 17 are provided for supplying coolant for cooling of the mandrels 15 and 16 and are intended to represent the temperature-control means in a highly diagrammatic form.

The described method of producing hollow extrusions from thermoplastic synthetic resin encompasses the cold-nozzle process in which the melt pressure prevails both in the die zone and in the calibrating tool and control processes which operate at the extruder or the product take-up side to maintain a constant flow of the melt and withdrawal of the extruded product. The technique described is however also suitable for use with melts which contain blowing agents and utilize pressure control and/or foam density to vary or control ratio of extruder speed (extruded mass flow) and product-withdrawal speed.

I claim:

1. A method of producing a hollow extrusion of a thermoplastic synthetic resin of a constant hollow-extrusion cross section over a length thereof, said method comprising the steps of:

(a) extruding a molten thermoplastic synthetic resin in a plurality of independent open partial-profile strands through a heated die zone in a pattern corresponding to cross-sectionally open segments of said hollow-extrusion cross section but with partial ribs having spaced-apart ends juxtaposed with one another across respective gaps into a cooled calibration zone, said strands being positioned and oriented correspondingly to the respective positions and orientations of said segments in said hollow-extrusion cross section;

(b) cooling said strands along inner and outer sides of said hollow-extrusion cross section while advancing said strands through said cooled calibration zone under extrusion-press pressure;

(c) maintaining an elevated temperature of said strands at least in a region of said ends over a starting portion of said cooled calibration zone, and (d) in said cooled calibration zone and downstream from said heated die zone feeding an afterflow of molten synthetic resin under said extrusion-press pressure into said gaps for fusion to ends of said partial ribs maintained at said elevated temperature and under heat of the molten synthetic resin thereby forming webs bridging the partial ribs and completing the hollow-extrusion cross section.

2. The method defined in claim 1, further comprising the step of initiating the cooling of said strands along said inner sides only in said cooled calibration zone.

* * * * *